US010286391B2

(12) United States Patent
Stamires et al.

(10) Patent No.: US 10,286,391 B2
(45) Date of Patent: May 14, 2019

(54) CATALYST SYSTEM HAVING MESO AND MACRO HIERARCHICAL PORE STRUCTURE

(71) Applicant: Inaeris Technologies, LLC, Pasadena, TX (US)

(72) Inventors: Dennis Stamires, Dana Point, CA (US); Michael Brady, Studio City, CA (US)

(73) Assignee: Inaeris Technologies, LLC, Pasadena, TX (US)

( * ) Notice: Subject to any disclaimer, the term of this patent is extended or adjusted under 35 U.S.C. 154(b) by 687 days.

(21) Appl. No.: 14/378,767

(22) PCT Filed: Feb. 15, 2013

(86) PCT No.: PCT/US2013/026297
§ 371 (c)(1),
(2) Date: Aug. 14, 2014

(87) PCT Pub. No.: WO2013/123297
PCT Pub. Date: Aug. 22, 2013

(65) Prior Publication Data
US 2015/0352541 A1 Dec. 10, 2015

Related U.S. Application Data

(60) Provisional application No. 61/600,153, filed on Feb. 17, 2012, provisional application No. 61/668,580, filed on Jul. 6, 2012.

(51) Int. Cl.
| | | |
|---|---|---|
| C10G 1/08 | (2006.01) | |
| C10G 3/00 | (2006.01) | |
| B01J 21/16 | (2006.01) | |
| B01J 29/06 | (2006.01) | |
| B01J 29/08 | (2006.01) | |
| B01J 29/18 | (2006.01) | |
| B01J 29/40 | (2006.01) | |
| B01J 29/70 | (2006.01) | |
| B01J 31/06 | (2006.01) | |
| B01J 31/26 | (2006.01) | |
| B01J 35/02 | (2006.01) | |
| B01J 35/10 | (2006.01) | |
| B01J 37/00 | (2006.01) | |
| B01J 37/28 | (2006.01) | |

(52) U.S. Cl.
CPC .............. *B01J 31/26* (2013.01); *B01J 29/06* (2013.01); *B01J 29/08* (2013.01); *B01J 29/084* (2013.01); *B01J 29/18* (2013.01); *B01J 29/40* (2013.01); *B01J 29/70* (2013.01); *B01J 29/7007* (2013.01); *B01J 31/06* (2013.01); *B01J 35/023* (2013.01); *B01J 35/109* (2013.01); *B01J 35/1061* (2013.01); *B01J 35/1071* (2013.01); *B01J 37/0018* (2013.01); *B01J 37/0045* (2013.01); *B01J 37/28* (2013.01); *C10G 1/086* (2013.01); *C10G 3/49* (2013.01); *B01J 21/16* (2013.01); *B01J 2229/186* (2013.01); *B01J 2229/42* (2013.01); *B01J 2231/005* (2013.01); *B01J 2231/49* (2013.01); *Y02P 30/20* (2015.11)

(58) Field of Classification Search
CPC .................................. B01J 31/26; B01J 29/06
See application file for complete search history.

(56) References Cited

U.S. PATENT DOCUMENTS

| | | |
|---|---|---|
| 2,992,068 A | 7/1961 | Haden et al. |
| 3,119,660 A | 1/1964 | Howell et al. |
| 3,338,672 A | 8/1967 | Haden et al. |
| 3,367,886 A | 2/1968 | Haden et al. |
| 3,433,587 A | 3/1969 | Haden et al. |
| 3,503,900 A | 3/1970 | Haden et al. |
| 3,506,594 A | 4/1970 | Haden et al. |
| 3,647,718 A | 3/1972 | Haden et al. |
| 3,663,165 A | 5/1972 | Haden, Jr. et al. |
| 3,867,308 A | 2/1975 | Elliott, Jr. |
| 4,016,106 A | 4/1977 | Sawyer et al. |
| 4,016,107 A | 4/1977 | Sawyer et al. |
| 4,016,108 A | 4/1977 | Robson |
| 4,086,187 A | 4/1978 | Lim et al. |
| 4,091,007 A | 5/1978 | Dwyer et al. |
| 4,235,753 A | 11/1980 | Brown et al. |
| 4,356,113 A | 10/1982 | Lim et al. |
| 4,493,902 A * | 1/1985 | Brown .................. B01J 29/084 423/712 |
| 4,522,705 A | 6/1985 | Chu et al. |
| 4,601,997 A | 7/1986 | Speronello |
| 4,624,773 A | 11/1986 | Hettinger, Jr. et al. |
| 4,965,233 A | 10/1990 | Speronello |
| 5,023,220 A | 6/1991 | Dight et al. |
| 5,182,243 A | 1/1993 | Brown et al. |
| 5,275,720 A | 1/1994 | Ward |

(Continued)

FOREIGN PATENT DOCUMENTS

| | | |
|---|---|---|
| EP | 0068817 | 10/1984 |
| EP | 0156595 | 3/1985 |

(Continued)

OTHER PUBLICATIONS

Caro et al. "Zeolite membranes—Recent developments and progress." Microporous and Macroporous Materials [online], Nov. 1, 2008 (Nov. 1, 2008), [Mar. 27, 2013], vol. 115, Iss. 3, pp. 215-233, Retrieved from the Internet: <URL: http://www.sciencedirect.com/science/ article/pii/S1387181108001406>.

(Continued)

Primary Examiner — Peter F Godenschwager
(74) Attorney, Agent, or Firm — John Wilson Jones; Jones Delflache LLP

(57) ABSTRACT

Processes for making a catalytic system and catalytic systems for converting solid biomass into fuel or specialty chemical products, or for upgrading bio-oils are described. The catalyst system may comprise a non-zeolitic matrix with a hierarchical pore structure ranging from 300 to about $10^4$ Angstrom pore size, a zeolite, such as MFI-type or IM-5 zeolite, and a binder.

12 Claims, No Drawings

(56) References Cited

U.S. PATENT DOCUMENTS

| | | |
|---|---|---|
| 5,395,809 A | 3/1995 | Madon et al. |
| 5,559,067 A | 9/1996 | Lerner et al. |
| 5,569,634 A | 10/1996 | Miller et al. |
| 5,951,963 A | 9/1999 | He et al. |
| 5,952,259 A | 9/1999 | Drake et al. |
| 6,114,267 A | 5/2000 | Ghosh et al. |
| 6,103,949 A | 8/2000 | Demmel et al. |
| 6,316,379 B1 | 11/2001 | Mao |
| 6,656,347 B2 | 12/2003 | Stockwell et al. |
| 6,696,378 B2 | 2/2004 | Gibson et al. |
| 6,716,785 B2 | 4/2004 | Stamires et al. |
| 6,908,603 B2 | 6/2005 | Xu et al. |
| 6,908,784 B1 | 6/2005 | Farnworth et al. |
| 6,942,783 B2 | 9/2005 | Xu et al. |
| 6,942,784 B2 | 9/2005 | Stockwell et al. |
| 6,943,132 B2 | 9/2005 | Stockwell et al. |
| 6,964,934 B2 | 11/2005 | Brady et al. |
| 6,971,594 B1 | 12/2005 | Polifka |
| 7,101,473 B2 | 9/2006 | Hurley |
| 7,208,446 B2 | 4/2007 | Stamires et al. |
| 7,341,976 B2 | 3/2008 | Espinoza et al. |
| 7,344,695 B2 | 3/2008 | Xu et al. |
| 7,589,041 B2 | 9/2009 | Ying et al. |
| 7,594,995 B2 | 9/2009 | Shen et al. |
| 7,976,696 B2 | 7/2011 | Ying et al. |
| 7,994,085 B2 | 8/2011 | Chaumonnot et al. |
| 8,003,835 B2 | 8/2011 | Yanik et al. |
| 8,007,663 B2 | 8/2011 | Ying et al. |
| 8,008,223 B2 | 8/2011 | Garcia-Martinez |
| 8,022,260 B2 | 9/2011 | O'Connor et al. |
| 2002/0038775 A1 | 4/2002 | Sterte et al. |
| 2002/0074263 A1 | 6/2002 | Shan et al. |
| 2002/0165083 A1 | 11/2002 | Lam et al. |
| 2003/0075481 A1 | 4/2003 | Chester et al. |
| 2004/0029717 A1 | 2/2004 | O'Connor et al. |
| 2006/0096891 A1 | 5/2006 | Stamires et al. |
| 2006/0264318 A1* | 11/2006 | Shan .............. B01J 21/06 502/60 |
| 2007/0135663 A1 | 6/2007 | Aalto et al. |
| 2007/0244341 A1 | 10/2007 | Kremer et al. |
| 2008/0299377 A1 | 12/2008 | Gu et al. |
| 2009/0090046 A1 | 4/2009 | O'Connor et al. |
| 2009/0227823 A1 | 9/2009 | Huber et al. |
| 2009/0294324 A1 | 12/2009 | Brandvold et al. |
| 2010/0105970 A1 | 4/2010 | Yanik et al. |
| 2011/0011721 A1 | 1/2011 | Champagne |
| 2011/0033375 A1* | 2/2011 | Chaumonnot .......... B01J 20/18 423/701 |
| 2011/0118107 A1 | 5/2011 | Garcia-Martinez et al. |
| 2011/0172482 A1 | 7/2011 | Cabiac et al. |
| 2011/0180455 A1 | 7/2011 | Bouchy et al. |
| 2011/0230333 A1 | 9/2011 | Voskoboynikov et al. |
| 2011/0313221 A1* | 12/2011 | Guillon ................. C10G 50/00 585/324 |
| 2012/0024776 A1 | 2/2012 | Garcia-Martinez |
| 2012/0117860 A1 | 5/2012 | Brady |
| 2013/0012376 A1 | 1/2013 | Barlek |
| 2016/0017238 A1 | 1/2016 | Stamires et al. |

FOREIGN PATENT DOCUMENTS

| | | | |
|---|---|---|---|
| EP | 0270211 | 4/1989 | |
| WO | 2004103558 | 12/2004 | |
| WO | 2004108281 | 12/2004 | |
| WO | 2007041851 A1 | 4/2007 | |
| WO | 200990046 | 7/2009 | |
| WO | WO 2009060143 A3 * | 8/2009 | .............. B01J 20/18 |
| WO | 2009118363 | 10/2009 | |
| WO | 2010105970 | 9/2010 | |
| WO | 2010124069 | 10/2010 | |
| WO | 2013123296 | 8/2013 | |
| WO | 2013123297 A2 | 8/2013 | |
| WO | 2013123299 | 8/2013 | |

OTHER PUBLICATIONS

Shan et al. "In situ synthesis of ZSM-5 with different Si.Al ratios on honeycomb-shaped cordierite and their behavior on NO decomposition" Chinese Chemical Letters, vol. 10, No. 10, pp. 885-888, 1999.

International Search Report and Written Opinion for International Application No. PCT/US 13/26297 dated Apr. 26, 2013.

Wyman et al. "Coordinated development of leading biomass pretreatment technologies", Bioresource Technology 96 (2005) 1959-1966.

McKendry, Peter "Energy production from biomass (part 1): overview of biomass", Bioresource Technology 83 (2002) 37-46.

M. Bjorgen, et al., Applied Catalysis A: General, 2008, vol. 345, 43-50.

Int'l Search Report and Written Opinion for Int'l Application No. PCT/US2013/26300 dated May 6, 2013.

S. Diamond, "Pore Size Distributions in Clays", Clays and Clay Minerals, 1970, vol. 18, pp. 7-23.

* cited by examiner

CATALYST SYSTEM HAVING MESO AND MACRO HIERARCHICAL PORE STRUCTURE

RELATED APPLICATIONS

This application is a National Phase application of International Application No. PCT/US2013/026297, filed Feb. 15, 2013, which claims the benefit of and priority to U.S. provisional application Ser. No. 61/600,153, filed Feb. 17, 2012, and U.S. provisional application Ser. No. 61/668,580, filed Jul. 6, 2012, the contents of each of the foregoing applications are hereby incorporated by reference in their entirety.

FIELD OF THE INVENTION

The invention relates to catalyst compositions comprising zeolites into clay matrixes exhibiting hierarchical pore structure, and more particularly to catalyst compositions for use in the catalytic thermoconversion of solid biomass material into liquid fuels or specialty chemicals, or for upgrading bio-oils.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) p 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals.

When biomass materials are subjected to thermal treatment, like in typical pyrolysis processes, the liquids/vapors generated comprise mostly large aromatic and poly nuclear aromatic molecules, which are directly released from the biomass as it is thermally decomposed. Additional polynuclear aromatic molecules can be formed from cross interactions of the nascent molecules at the biomass/vapor interface and in the vapor phase. It is known that long residence times as well as large biomass particles enhance these side reactions and the fuel oil products produced contain larger molecules at a given thermolysis operating reactor temperature. To that effect, the operating parameters need to be optimized for a given kind of biomass material to obtain the maximum oil yield, minimum liquid hydrocarbon oxygen content, and minimum gas and coke yields.

There is a need to develop cost-effective catalyst to be used during the thermolysis process in order to catalytically crack some of the large molecules to lighter ones and at the same time cause an optimum deoxygenation so that the liquid oil will contain light molecules and less overall oxygen.

SUMMARY OF THE INVENTION

Aspects of the invention relate to catalyst systems and methods of making catalyst systems for use in the thermoconversion of biomass, or for the upgrading of bio-oils. In some embodiments, a biomass conversion catalyst precursor according to the invention comprises a non-zeolitic inorganic matrix, a binder, a zeolite and a combustible organic material. In some embodiments, a catalyst system according to the invention comprises a zeolite, a non-zeolitic matrix with a hierarchical pore structure ranging from about 300 to about $10^4$ Angstrom pore size, and a binder.

In some embodiments, the zeolite may be selected from the group of ZSM-5, ZSM-33, ZSM-11 and combination thereof. In some embodiments, the zeolite can be beta zeolite, mordenite. In other embodiments, the zeolite can be a Faujasite-type zeolite, such as Zeolite Y, USY zeolite, REUSY zeolite, DAY zeolite, dealuminated USY zeolite or a combination thereof.

In some embodiments, the non-zeolitic matrix can be a silica, an alumina, a combination of silica and alumina, a clay, or a combination of any of the foregoing. In another embodiment, the non-zeolitic matrix is substantially alumina-free. In other embodiments, the catalyst comprises silica and clay. In some embodiments, the catalyst comprises silica, alumina and clay. In further embodiments, the clay can be a dealuminated clay, a leached clay, a calcined clay or combination thereof.

According to some embodiments, the zeolite is an IM-5 zeolite or a modified IM-5 zeolite, such as a dealuminated IM-5 zeolite, a desilicated IM-5 zeolite or a phosphated IM-5 zeolite. In some embodiments, the catalyst system comprises a IM-5 zeolite, a non-zeolitic matrix with a hierarchical pore structure ranging from about 100 to about 6,000 angstrom pore size, and a binder. In some embodiments, the matrix has a hierarchical pore structure ranging from 100 to about 1,000 angstrom or from 400 to 6,000 angstrom or higher. In some embodiments, the matrix comprises a clay or clay mixture. In some embodiments, the matrix comprises silica, alumina, silica-alumina, or combination thereof. In some embodiments, the matrix comprises a synthetic clay.

In some embodiments, the binder can be silica, phosphate polysilicate, ammonium polysilicate or silicic acid.

Aspects of the invention may include a combustible organic material in the form a fine particulate, having a size in the range of 300 to about $10^4$ Angstrom or higher, or 500 to about $5 \times 10^3$ Angstrom or higher. In some embodiments, the organic material is selected from the group consisting of compounds containing cellulosic type, starch, sawdust, corn flour, wood flour, shortgum, gums, corn stover, sugar bagasse, plastic, resin, rubber, carbohydrates, organic polymers or mixtures thereof. In some embodiments, the carbohydrate is a cellulosic type carbohydrate. In some embodiments, the organic material is soluble in water.

In some embodiments, the catalyst system further comprises phosphorous, oxides of alkaline earth, rare earth, transition and metal groups, hydroxides of alkaline earth, rare earth, transition and metal groups, or a combination of any of the foregoing.

Aspects of the invention relate to methods of preparing a biomass catalyst system, the method comprising (a) preparing a slurry precursor mixture by mixing a zeolite, a non-zeolitic inorganic matrix, a binder, and a combustible organic compound in water; (b) shaping the mixture to form shaped bodies; and (c) thermally treating the shaped bodies to remove the combustible organic compound; thereby forming the biomass catalyst system having a structured porosity with pore sizes ranging from 300 to about $10^4$ Angstrom and zeolite throughout the matrix. The zeolite can be selected from the group of ZSM-5, ZSM-33, ZSM-11 and combination thereof. In some embodiments, the zeolite can be beta zeolite, or a mordenite. In other embodiments, the zeolite can be a Faujasite-type zeolite, such as Zeolite Y, USY zeolite, REUSY zeolite, DAY zeolite, dealuminated USY zeolite and combination thereof. In some embodiments, the structured porosity of the catalyst system allows for increased accessibility to the zeolite.

In some embodiments, the non-zeolitic matrix can be a silica, an alumina, a combination of silica and alumina, a silica-alumina, a clay or combinations thereof. In other embodiments, the non-zeolitic matrix can be substantially alumina-free. In some embodiments, the binder can be silica, alumina, clay, modified clay, ammonium polysilicate or combinations thereof. In some embodiments, the clay can be a dealuminated clay, a leached clay, a calcined clay or combination thereof. In some embodiments, the non-zeolitic inorganic matrix is in the form of a silica solution, such as silicic acid or silica gel. In some embodiments, the binder can be a silica binder or ammonium polysilicate.

In other embodiments, the zeolite can be first impregnated with a phosphoric solution before being mixed with the inorganic matrix; binder and combustible organic compound. In some embodiments, the zeolite can be further dried and calcined before step (a).

In another embodiment, the method further comprises washing the shaped bodies before step (c). In some embodiments, the method further comprises subjecting the shaped bodies to ion-exchange before step (c). In some embodiments, the method further comprises subjecting the shaped bodies to calcination.

In some embodiments, the method further comprises mixing by mixing a zeolite, a non-zeolitic inorganic matrix, a binder, a combustible organic compound in water with phosphate, oxides of alkaline earth, rare earth, transition and metal groups, hydroxides of alkaline earth, rare earth, transition and metal groups, or combinations thereof.

Aspects of the invention relate to a method for preparing a catalyst system, the method comprising (a) preparing a slurry precursor mixture by mixing IM-5 zeolite, a non-zeolitic inorganic matrix, a binder, a combustible organic compound in water; (b) shaping the mixture to form shaped bodies; and (c) thermally treating the shaped bodies to remove the combustible organic compound, wherein the catalyst system has a matrix phase having a hierarchical mesoporous-macroporous structure. In some embodiments, the method further comprises modifying the IM-5 zeolite prior to preparing the slurry precursor mixture. In some embodiments, the step of modifying the IM-5 zeolite comprises treating the thermally treated IM-5 zeolite with a mild acid to remove the non-framework alumina. In some embodiments, the acid can be an organic acid or an inorganic acid. For example, the inorganic acid can be nitric acid, hydrochloric acid, sulfuric acid or mixture thereof. The organic acid can be acetic acid, oxalic acid, citric acid or mixture thereof.

In some embodiments, the step of modifying comprises (i) treating the zeolite with a base to remove part of the silica framework and optionally further (ii) treating the base treated zeolite with a mild acid. In some embodiments, the base can be sodium hydroxide, sodium carbonate, sodium bicarbonate, sodium aluminate, or a mixture thereof.

In some embodiments, the shaped bodies can be treated with a mild acid solution to dealuminate the zeolite before step (c).

In some embodiments, the zeolite can be treated with a phosphorous compound.

In some embodiments, the shaped bodies are formed by spray-drying the slurry.

In some embodiments, the step of thermally treating comprises subjecting the shaped bodies to calcination or steaming and heating the thermally treated shaped bodies in presence of a mild acid to remove the non-framework alumina. In other embodiments, the step of thermally treating comprises subjecting the shaped bodies to calcination or steaming and treating the thermally treated shaped bodies in presence of a weak base to desilicate the zeolite. For example, the weak base can be sodium carbonate, ammonium hydroxide or a combination thereof.

In some embodiments, the combustible organic material is in the form of a fine particulate with size ranging from 300 to about $10^4$ Angstrom or 500 to about $5 \times 10^3$ Angstrom or higher. In some embodiments, organic material is material is selected from the group consisting of compounds containing cellulosic type, starch, sawdust, corn flour, wood flour, shortgum, gums, corn stover, sugar bagasse, plastic, resin, rubber, carbohydrates, such as cellulosic type carbohydrate or mixtures thereof.

Aspects of the invention relate to a composition for the conversion of biomass comprising a catalyst system comprising a zeolite, a non-zeolitic matrix with a hierarchical pore structure ranging from about 300 to about $10^4$ Angstrom pore size, and a feedstock having a carbon $^{14}C$ isotope content of about 107 pMC. In some embodiments, the zeolite is selected from the group of ZSM-5, ZSM-33, ZSM-11, beta zeolite, mordenite, Faujasite-type zeolite, Zeolite Y, USY zeolite, REUSY zeolite, DAY zeolite, dealuminated USY zeolite and combination thereof. In some embodiments, the non-zeolitic inorganic matrix is a silica, an alumina, a combination of silica and alumina, a silica-alumina, a clay or combinations thereof. In some embodiments, the feedstock is a particulated biomass, or is a product derived from pyrolysis of biomass, such as a bio-oil vapor or a bio-oil.

Other aspects of the invention relate to a composition for the conversion of biomass comprising a catalyst system comprising a IM-5 zeolite, a non-zeolitic matrix with a macroporosity from about 100 to about 5,000 angstrom pore size range, and a binder; and a feedstock having a carbon $^{14}C$ isotope content of about 107 pMC. In some embodiments, the zeolite is an IM-5 zeolite or a modified IM-5 zeolite, such as a dealuminated IM-5 zeolite, a desilicated IM-5 zeolite or a phosphated IM-5 zeolite.

In some embodiments, the feedstock is a particulated biomass, or is a product derived from pyrolysis of biomass, such as a bio-oil vapor or a bio-oil.

DETAILED DESCRIPTION OF THE INVENTION

Most of the known fluid catalytic cracking (FCC) catalysts have been designed to catalytically crack light petroleum feeds, or Vacuum Gas Oil (VGO) that contain light hydrocarbon molecules, few poly nuclear aromatic molecules and in general few bulky molecular components. A few FCC catalysts have been designed and used to crack heavy resid feeds. The discovery of zeolitic FCC catalysts and their use in oil refineries made it possible to substantially reduce the contact times between the oil feed and catalyst particles, and improve product yield and product selectivity. However, when using short contact times and heavier feedstocks containing larger size molecules, the availability and accessibility of the catalytic active sites within the zeolite crystals can be reduced. In addition, when using heavier feedstocks such as heavy oils or resids as feeds catalytic cracking systems operating with short residence times, skin-layers of contaminant metals can formed on the outside surface of the catalyst particles causing the blocking of the pore openings and the pathways that lead to the zeolite particles (referred herein as "Matrix Accessibility Limitations" or "MAL").

In some aspects of the invention, the catalyst microsphere particles can be designed to have a suitable particle bulk architecture such as three dimensional interconnecting pathways within the bulk of the catalyst particles to enable full potential of the catalytic active sites of the zeolite and minimize the undesirable side reactions. In some embodiments, the catalyst particles contain interconnecting channels wherein the zeolite crystals can be homogeneously dispersed and suspended. Such architecture allows for the zeolite crystals to be available to the entering reactant oil molecules, and at the same time allow the cracked product molecules formed on the zeolite active sites to diffuse out of the zeolite crystals and out of the catalyst microspherical particles. Increasing the diffusion rates can minimize cross interactions between the product molecules and the entering reactant molecules, and minimize undesirable side reactions that can lead to the formation of coke and light gases. In some embodiments, the methods provided herein allow for the formation of catalyst particles having an architecture designed to maximize diffusion and mass transport, and allow for maximum yield and selectivity, with minimum coke and gas formations.

In a simplified model, the catalyst comprises a matrix and a zeolite component with connected conduits, each component having a plurality of pores, cavities and interconnecting channels, some of which being aligned and providing free pathways leading from the pores at the surface of the catalyst particles to the interior of the zeolite crystal and to the active site locations.

In order for the reactant molecules to be able to react with the zeolite active sites located in the bulk of the zeolite crystal, the reactant molecules need to travel through the microsphere particle matrix and through the zeolite crystal. This journey involves diffusing first through the pores and pathways provided by the matrix and then through the pores and pathways of the zeolite crystals. If the pores and pathways within the matrix are larger than those of the zeolite, the passage of the reactant molecules can be facilitated and non-selective thermal cracking at the pore openings, which may result in coke deposits, can be reduced. Coke deposits resulting in pore blockage can restrict the diffusion of reactant molecules, increasing the residence time the reactant molecule within the matrix. This can cause non-selective cracking and additional coke and gas formation, thus rendering the zeolite less effective and less selective. In addition, if the openings of the pores/channels are not sufficiently large, metals can be deposited at the pore openings further hindering and limiting the diffusion of the reactant molecules through the matrix to the zeolite crystals. In other words, it can be envisioned that the reactant molecules move through a multi-lane channeled super highway which leads them to the zeolite crystal pore openings and to narrow pathways that lead to the catalyst active sites in the interior of the zeolite crystals. This represents the in-bound traveling mass towards the zeolite active sites located in the interior of the zeolite crystals.

One skilled in the art will appreciate that the overall mass diffusion process is more complicated since the reactant molecules can be converted into lighter molecules at the zeolite catalytically active sites. These lighter molecules need also to be able to exit the bulk of the zeolite crystals, and to use the matrix pathways to exit the catalyst microsphere particles as a gas phase. To facilitate the cross-diffusion of the in-bound reactant molecules and the out-bound reactant products, both the matrix and the zeolite phases need to have large and interconnecting pathways (or channels), and the minimum hindrance.

Matrix and zeolite diffusional limitations can be more pronounced when the oil feed contains larger size molecules, such as the poly nuclear aromatic molecules, increasing the overall residence times within the zeolitic and the matrix phases, and resulting in side-cross-reactions between the catalytically converted products and between the reactant molecules and the catalytically converted products. Such side-reactions can form undesirable by-products because the nascent molecular species produced by the cracking of the reactant molecules are in the form of free-radicals before being transformed into stable products. The free radicals can be highly reactive and interact within themselves and/or the incoming reactant molecules, resulting in longer residence times due to restricted diffusion, and resulting in coke formation and metal deposits which can plug the pore openings and inactivate the zeolite crystals.

For heavy oil feeds and in particular for bio-oils containing large poly nuclear aromatic molecules, pores with diameters of about 100 Angstrom or 200 Angstrom can cause diffusional restrictions. The inherent tendency of the large poly nuclear aromatic molecules to form coke can be substantially enhanced by the restricted diffusion through the smaller pore openings and pathways of the matrix. Larger molecules can coat the walls of the pathways, decreasing the effective free-space available for the rest of the reactant molecules diffusing towards the catalyst active sites. Consequently, according to some embodiments, it would be advantageous, when handling oil feeds containing large poly nuclear aromatic molecules, to use matrix having appropriate pore volumes and reduced diffusional limitations. In some embodiments, the catalyst particles have large pores and pathways throughout the matrix and the zeolite crystals for efficient and selective conversion process. Considering that the heavy oil resid feeds and the different kinds of bio-oils derived from the thermoconversion or catalytic thermoconversion of various kind of biomass can contain a very wide spectrum of molecules with different sizes, in some embodiments, the matrix can be designed to have a large portion of its pore volume with pore sizes suitable to accommodate the portion of feed having large size molecules ranging from about 300 to 800 Angstrom. In some embodiments, under a steady-state equilibrium condition, the diffusion rates of the reactants and products in and out of the catalyst particle may be equal.

Further, there can be a certain amount of non-selective thermal cracking taking place within the matrix, primarily producing additional light gases and additional coke that can be deposited within the pores. This can result in a further restriction of the diffusion of the reactant molecules towards the zeolite crystals. The accessibility of the active sites can then be further restricted as the diffusion through the matrix is the controlling rate.

Still further, in most matrix compositions such as silica-alumina, alumina, silica, alumina-phosphates, titania, titania-alumina and the like, the active acid sites can crack some of the molecules of the feed into smaller molecules, such as "alkyl-species". These smaller cracked "alkyl" products can be the feed to the zeolite active sites.

An additional benefit of catalysts with matrixes having large pore openings and channels, relates to the rates of catalyst deactivation and subsequent catalyst regeneration in term of burning off the deposited coke. Catalysts with matrixes having larger pore openings can exhibit slower deactivation and faster regeneration rates for burning the coke off the catalyst particles.

One skilled in the art will appreciate that catalyst microspheres with super porosities having large diameter pore sizes can weaken the particle mechanical/physical strength and cause breaking of the catalyst particles. As the catalyst particles are continuously circulated in the fluid bed reactor with considerable high velocities, moving through slide values and other tortuous parts of the circulating system, including the regenerator stripper, etc, the catalyst particles are subjected to a substantial amount of mechanical impacts, as well as collisional impacts between the individual particles and the walls of the vessels and reactor. To be able to maintain the particle integrity and avoid loss of mass, the catalyst particles must exhibit a certain amount of physical/mechanical strength and have a reasonable attrition resistance. As such, in some embodiments, the catalyst particles composition and architecture can be optimized to have suitable attrition resistance and catalytic site porosity accessibility.

Aspects of the invention relate to catalyst compositions comprising matrixes exhibiting hierarchical pore structures for use in the catalytic thermoconversion of solid biomass material into liquid fuels or specialty chemicals. As discussed above, in order to develop effective catalysts for use in the catalytic thermolysis of the biomass, since the produced molecules from the biomass thermal decomposition have large size, and since the reactant molecules and catalyst particles are in contact only for a short residence time, it can be advantageous that the catalyst matrix contains large pores and pathways to the reactant molecules and cracked products to be transported in and out of catalyst particle rapidly and with minimum diffusional hindrance. In other words, the reactant molecules need to have sufficient accessibility to the zeolitic crystal through the matrix pores and pathways and to the zeolite active sites located within the bulk of the zeolite crystal.

In some aspects, the invention relates to catalyst compositions comprising zeolites on a matrix having custom-made or engineered hierarchical pore structures. Such compositions allow for the reactant oil-feed molecules to come directly in contact with the catalytically active sites located in the zeolitic phase, without being retarded by matrix diffusion limitations.

In some embodiments, the catalyst's chemical composition and the pore architecture of the catalyst particle can be optimized for achieve minimal matrix accessibility limitation. For example, the number of active catalyst sites located in the matrix and in the zeolite, the pore volume and pore sizes of the matrix architecture, the accessibility and the crystal size of the small-pore zeolites can be optimized for use in catalytic thermolysis of biomass.

It should be noted, that catalyst compositions, besides being exposed to continuous impacting with metallic surfaces when introduced and moved through the thermoconversion reactor, can be additionally impacted by collisions with the solid biomass feed particles. When biomass feed particles contain inorganic matter, for example clays, sand, etc., the collision of the catalyst with such biomass particles may cause more attrition to the catalyst particle mass.

The attrited material produced by the fracture and/or by the surface grinding of the catalyst particle may include smaller fragmented particles and microfines, having sizes down to submicron and to the colloidal ranges. The submicron attrited particles may react with the nascent formed bioacids in the hot reactor environment, to form other organometallic colloidal complexes. In some cases, such very fine dispersions of sub-micron colloidal formed materials may end up being dispersed in the oil phase product coming out from the thermoconversion process. Although it may be difficult and costly to remove these mixtures of fine particles and colloidal phases from the bio-oil, it is generally necessary to remove these mixtures from the bio-oil to obtain a substantially clean bio-oil to be used as a feed to the hydroprocessing reactors containing the hydrotreating catalyst. Removal of mixtures of fine particles and colloidal phases from the bio-oil can avoid catalyst deactivation, flow plugging and/or back pressure increase.

In some embodiments, in order to facilitate the overall upgrading process of the crude bio-oil, including filtrations, water phase separation and in order to protect the catalyst during the hydrotreating steps, catalysts for the thermoconversion should exhibit suitable attrition resistance to the overall exposure the catalyst experiences. In some embodiments, the catalyst compositions may exhibit high attrition resistance to the mechanical exposure with the metal surfaces of the reactor including valves, feeders, cyclones, and the like, with the biomass and with metallic contaminants associated with the biomass. In some embodiments, the catalyst compositions can exhibit high attrition resistance to chemical exposure such as the hot acidic compounds generated by the thermoconversion of biomass in the reactor.

Aspects of the invention provide methods to form microsphere particles that have larger pore and channels throughout the catalyst particle and zeolites. Such large interconnecting pathways within the matrix and microsphere particles allow the zeolite crystals to be homogeneously suspended, dispersed, and be sufficiently accessible to the reactant oil-feed molecules. The zeolitic and matrix phases can be modified to exhibit suitable attrition resistance and/or be more effective in the catalytic thermoconversion of biomass to bio-oils and hence in reducing the coke formation and/or catalyst deactivation rates.

In some embodiments, the matrix can be a non-zeolitic inorganic matrix such as silica, alumina, or a combination of silica and alumina, a clay, modified clay, or combinations thereof. In some embodiments, the modified clay, is a calcined clay, an acid- or base-leached clay, or dealuminated clay or combination thereof.

In some embodiments, the zeolite is a Mordenite Inverted Framework (MFI)-type, such as ZSM-5. In some embodiments, the zeolite is a Faujasite-type zeolite, such as Zeolite Y. In other embodiments, the zeolite can be ZSM-5, a mordenite, a beta zeolite, ZSM-33, ZSM-11, Zeolite Y, Zeolite USY, REUSY zeolite, DAY zeolite, dealuminated USY zeolite or combinations thereof.

In some embodiments, the zeolite can be IM-5 zeolite. IM-5 zeolite is in the family of the MFI-zeolite. However, IM-5 zeolite has larger pore openings with bi-dimensional network of crossing channels with 10-member rings. IM-5 zeolite has about twice the number of Bronsted active sites. Such properties can make IM-5 zeolite substantially more catalytically active as compared to ZSM-5, for example for n-decane cracking, which is the standard catalytic test to measure catalytic activity of ZSM and its rate of deactivation used in the usual FCCU operation for enhancing propylene production.

The higher acid site density and larger void space in the bulk of the IM-5 crystals can result in increasing rate of biomolecular reaction in the IM-5 zeolite as compared to the ZSM-5 zeolites. In addition, IM-5 zeolites demonstrate a substantially higher thermal and hydrothermal stability. In some embodiments, the high resistance of the IM-5 zeolite is reflected by the slow rate of dealumination during thermal and hydrothermal deactivation. One of skill in the art will appreciate that considering that the IM-5 zeolite is more catalytically active, more selective and more thermally and hydrothermally stable than ZSM-5, the IM-5 zeolite can be more suited to be used in the thermolysis of biomass or the upgrading of bio-oils.

In some embodiments, the IM-5 zeolite is a modified IM-5 zeolite, such as a dealuminated IM-5 zeolite, a desilicated IM-5 zeolite, or phosphated IM-5 zeolite. In some embodiments, the modified IM-5 zeolite can be obtained by thermally treating the IM-5 zeolite with a mild acid to remove the non-framework alumina. For example, the acid can be an organic acid, such as acetic acid, oxalic acid, citric acid or mixture thereof or an inorganic acid, such as, nitric acid, hydrochloric acid, sulfuric acid or mixture thereof. In some embodiments, the step of thermally treating can comprise subjecting the shaped bodies to calcination or steaming and heating the thermally treated shaped bodies.

In some embodiments, the zeolite can be thermally treated with a base to remove part of the silica framework. For example, the base can be sodium hydroxide, sodium carbonate, sodium bicarbonate, sodium aluminate, or a mixture thereof. In some embodiments, the step of thermally treating comprises subjecting the shaped bodies to calcination or steaming and treating the thermally treated shaped bodies in presence of a weak base to desilicate the zeolite. In some embodiments, the zeolite can be first treated with a base to remove at least part of the silica framework and then treated with a mild acid to remove at least part of the non-framework alumina.

In some embodiments, the zeolite on the macroporous microspheres can be subjected to ion-exchange with cations such as ammonium, protons, alkaline and alkaline earth, transition and rare earth metals, as well as noble metals and compounds bearing phosphorous. In some embodiments, the zeolite can be a Rare Earth exchanged zeolite.

In some embodiments, the method for making catalyst compositions comprises forming a slurry containing a clay and binder components, and incorporating in the slurry an organic material or pore regulating agent, in a fine particular size form. In some embodiments, the organic material can be combustible when calcined in air, so that when the organic material escapes from the catalyst microsphere in a gaseous form, it leaves behind extra bulk porosity and pathways.

In some embodiments, the methods for making catalyst compositions comprises the steps of (a) forming a slurry comprising the catalyst components and a combustible pore regulating agent in a fine particular form; (b) forming shaped bodies and (c) burning off the pore regulating agent to form shaped bodies with designed meso and macro hierarchical pore structure.

The calcination can be carried out at a temperature from about 200° C. to about 1,200° C. for a time from about 0.1 hour to about 100 hours. In some embodiments, the calcination step is carried out at a temperature from about 550° C. to about 650° C. In some embodiments, the calcination step is carried out at about 600° C.

In some embodiments, the pore structure can comprise pore sizes ranging from about 20 to about 5,000 Angstrom, from about 100 to about 5,000 Angstrom, from about 200 to about 2,000 Angstrom, from about 100 to about 2,000 Angstrom, from about 500 to about 5,000 Angstrom, or from about 300 to about 10,000 Angstrom.

In other embodiments, low cost materials derived from agricultural products can be used as pore regulating agents (PRA). These materials have the advantage of not to being hazardous to human health, being producible at relative low cost compared to known pore regulating agents such as carbon black and soluble organic polymers. These materials include, but are not limited to, cellulosic types, starches, sawdust, corn flowers, wood flowers, shortgum, gums, and the like.

In some embodiments, combustible organic materials includes waste plastics, for example, selected and collected from the municipal solid waste. Such materials can be crushed to small size chips, ground and pulverized in high energy mills to produce fine powders having particles sizes in the micron and submicron ranges. In other embodiments, fine powders can be produced using vortex cyclonic jet mills, as described in U.S. Pat. No. 6,971,594, incorporated herein by reference in its entirety.

According to some embodiments, materials with lignocellulosic compositions such as woody materials from forestry or agricultural cellulose products such as corn stover, sugar bagasse, and the like, can be processed similarly to fine powders with defined particle sizes in the micron and submicron ranges. In some embodiments, the organic materials may include saw dust produced in wood mills.

In some embodiments, catalyst compositions having a hierarchical meso/macro porous structure can be formed using a clay or portion of the clay that has a different particle morphology than the hydrous kaolin clay, such as, for example, delaminated kaolin, halloysite, diatomaceous earth, sepiolite, attapulgite or combinations thereof.

In some embodiments, the clay can be first treated with an acid or base to leach out some of the lattice metals. Delaminated clay, such as delaminated kaolin, may optionally be calcined. The delaminated clay can be treated with an acid to remove a portion of the clay-lattice alumina, or with an alkaline to remove a portion of the clay-lattice silica.

In some embodiments, clays with different particle morphologies can be used in combination with dealuminated or desilicated clays.

In some embodiments, combinations of alumino-silicate, alumina, silica that have been calcined to form transition phases, for example spinels or mixed-metal-oxides phases can be used.

In some embodiments, the clay material can be used in combination with a pore regulating agent, such as a combustible material. The combustible material can comprise a plastic, resin, rubber, carbohydrates or combinations thereof.

In some embodiments, the microspheres or shaped bodies containing pore regulating agent can be acid leached. The acid leaching of the shaped bodies containing the pore regulating agent can be done after a calcination step that may remove (e.g. by burning off) the pore regulating agent. Leaching the shaped bodies after the calcination step can have the advantage of forming physically stronger shaped bodies that can retain their shape and strength during the acid leaching process. Alternatively, the calcined clay (e.g. calcined kaolin clay) can be acid-leached before it is formed into shaped bodies. In some embodiments, the calcined shaped bodies can be base-leached to remove part of the silica from the clay and increase their porosity. The base-leached can be used for the formation of the catalyst composition with proper adjustments of the silica content and seeds addition as described below.

In some embodiments, the method of making the catalyst compositions comprises forming clay-based microspheres comprising a carbohydrate combustible pore regulating material such as, for example, wood flour, and calcining microspheres. The calcined microsphere can subsequently be acid leached to remove a portion of the alumina content of the clay phase.

In some embodiments, the method comprises adding the zeolite in the slurry precursor mixture comprising the non-zeolitic matrix, binder and combustible material. In some embodiments, the zeolite is a small pore zeolite such as ZSM, B-Zeolite, silicalite and mordenite or zeolite having larger pores opening such as IM-5 zeolite. Small-pore zeolites such as ZSM, B-Zeolite, silicalite and mordenite can be more selective cracking catalysts and produce less coke and light gases than the Y types for cracking bio oils. These small-pore zeolites types have a much higher silica to alumina molar ratio of the crystal composition which gives a smaller amount of active acid sites. In addition, due to the smaller pore openings, only smaller feed molecules are able to enter, resulting in lesser over-cracking and lesser coke and gas yields.

In some embodiments, catalysts having a matrix with a hierarchical pore structure and IM-5 or a modified form of IM-5 zeolite can be used in the thermoconversion of biomass. Yet, according to some embodiments, catalysts having a matrix with large pore sites and with a small amount of active catalyst sites, hosting small-pore zeolites such as ZSM, beta zeolite, or mordenite, and having small crystal sizes can be used in biomass thermoconversion.

In some embodiments, the catalyst microsphere bulk porosity can be optimized against its required physical strength and attrition resistance when used in the fluidized bed reactor with very short residence times.

In some embodiments, the matrix active sites can crack some of the larger reactant molecules to smaller fragments having a size suitable to enter the zeolitic phase of the catalyst particle. The zeolite can subsequently further crack these fragments to lighter molecules. Matrixes with high catalytic activity, such as alumina or silica-alumina, can produce excessive amounts of cracked fragments and such large concentration of matrix cracked fragments may not be able to be taken up fast enough by the small pore zeolite crystals. As a result, the smaller fragments can cross-interact and over crack forming a greater amount of coke within the matrix pore regions, thus blocking the pore openings to the zeolite crystal.

One skilled in the art will appreciate that biomass or products derived from pyrolysis of the biomass, such as oil/vapor products, can be distinguished from products containing fossil carbon by the carbon $^{14}$C isotope content (also referred herein as radiocarbon).

Carbon $^{14}$C isotope is unstable, having a half life of 5730 years and the relative abundance of carbon $^{14}$C isotope relative to the stable carbon $^{13}$C isotope can enable distinction between fossil and biomass feedstocks. In some embodiments, the presence of $^{14}$C isotope can be considered as an indication that the feedstocks or products from pyrolysis include renewable carbon rather than fossil fuel-based or petroleum-based carbon. Carbon $^{14}$C isotope of the total carbon content of renewable feedstock or products derived from renewable feedstock is typically 100% whereas the carbon $^{14}$C isotope of the total carbon content of petroleum-based compounds is typically 0%.

Assessment of the renewably based carbon content of a material can be performed through standard test methods, e.g. using radiocarbon and isotope ratio mass spectrometry analysis. ASTM International (formally known as the American Society for Testing and Materials) has established a standard method for assessing the bio-based or renewable carbon content of materials. The application of the ASTM-D6866 can be used to derive bio-based or renewable carbon content. The analysis can be performed by deriving a ratio of the amount of carbon $^{14}$C in an unknown sample compared to that of a modern reference standard. This ratio is reported as percent modern carbon or pMC. The distribution of carbon $^{14}$C isotope within the atmosphere has been approximated since its appearance, showing values that are greater than 100 pMC for plants and animals living since AD 1950. The distribution of carbon $^{14}$C isotope has gradually decreased over time with values of about 107.5 pMC. In some embodiments, biomass or compounds derived from biomass have a carbon $^{14}$C signature of about 107.5 pMC.

Some aspects of the invention relate to compositions for the conversion of biomass comprising a catalyst system comprising a zeolite, a non-zeolitic matrix with a hierarchical pore structure ranging from about 300 to about $10^4$ Angstrom pore size, and a feedstock having a carbon $^{14}$C isotope content of about 107 pMC. In some embodiments, the zeolite is selected from the group of ZSM-5, ZSM-33, ZSM-11, beta zeolite, mordenite, Faujasite-type zeolite, Zeolite Y, USY zeolite, REUSY zeolite, DAY zeolite, dealuminated USY zeolite and combination thereof. In some embodiments, the non-zeolitic inorganic matrix is a silica, an alumina, a combination of silica and alumina, a silica-alumina, a clay or combinations thereof.

Other aspects of the invention relate to a composition for the conversion of biomass comprising a catalyst system comprising a IM-5 zeolite, a non-zeolitic matrix with a macroporosity from about 100 to about 5,000 angstrom pore size range, and a binder; and a feedstock having a carbon $^{14}$C isotope content of about 107 pMC. In some embodiments, the zeolite is an IM-5 zeolite or a modified IM-5 zeolite, such as a dealuminated IM-5 zeolite, a desilicated IM-5 zeolite or a phosphated IM-5 zeolite.

In some embodiments, the feedstock is a particulated biomass, or is a product derived from pyrolysis of biomass, such as a bio-oil vapor or a bio-oil.

The present invention provides among other things catalysts systems, processes of making the catalyst systems and methods for converting biomass into fuel and chemicals. While specific embodiments of the subject invention have been discussed, the description herein is illustrative and not restrictive. Many variations of the invention will be come apparent to those skilled in the art upon review of this specification. The full scope of the invention should be determined by reference to the claims, along with their full scope of equivalents, and the specification, along with such variations.

EXAMPLES

Example 1

A silica sol was prepared by simultaneous addition of 15% sodium silicate solution together with a 50% sulphuric acid to water, while maintaining a pH of about 2.

The silicic sol prepared above was combined with kaolin clay, MFI ZSM Zeolite and 5-10% of fine particle starch and homogenized in a high speed mixer.

The proportions of these components were used so that the final catalyst product contains 40% MFI ZSM-5 Zeolite, 25% silica, 10% starch and 25% kaolin clay.

The resulting slurry was spray dried to produce microspheres of typical average particle size of 80 microns. The microspheres were washed and ion-exchanged with a solution of ammonium nitrate to remove the sodium. The washed microspheres were calcined at 500° C. for 2 hours.

Example 2

A silica sol was prepared by simultaneous addition of 15% sodium silicate solution together with a 50% sulphuric acid to water, while maintaining a pH of about 2.

The silicic sol prepared above was combined with kaolin clay, MFI ZSM Zeolite and 5-10% of fine particle starch and homogenized in a high speed mixer. The MFI ZSM Zeolite used was first impregnated with 15% phosphoric acid solution, dried and calcined 700° C. for 4 hours and then mixed in the slurry with the rest of components, homogenized and spray dried to form microspheres.

The proportions of these components were used so that the final catalyst product contains 40% MFI ZSM-5 Zeolite, 25% silica, 10% starch and 25% kaolin clay.

The resulting slurry was spray dried to produce microspheres of typical average particle size of 80 microns. The microspheres were washed and ion exchanged with a solution of ammonium nitrate to remove the sodium. The washed microspheres were calcined at 500° for 2 hours.

Example 3

In this example, the silica binder used in Example 2 was replaced with the ammonium stabilized polysilicic acid.

INCORPORATION BY REFERENCE

Reference is made to U.S. Provisional Patent Application No. 61/600,148, entitled "CATALYST COMPOSITIONS COMPRISING IN SITU GROWN ZEOLITES ON CLAY MATRIXES EXHIBITING HIERARCHICAL PORE STRUCTURES", filed on Feb. 17, 2011, to U.S. Provisional Patent Application No. 61/600,153, entitled "CATALYST COMPOSITION WITH INCREASED BULK ACTIVE SITE ACCESSIBILITY FOR THE CATALYTIC THERMOCONVERSION OF BIOMASS TO LIQUID FUELS AND CHEMICALS", filed on Feb. 17, 2011, to U.S. Provisional Patent Application No. 61/600,160, entitled "CATALYST COMPOSITION COMPRISING MATRIXES AND ZEOLITES WITH HIERARCHICAL PORE STRUCTURES FOR OPTIMUM ACTIVE SITE ACCESSIBILITY FOR USE IN THE CATALYTIC THERMOCONVERSION OF BIOMASS TO LIQUID FUELS AND CHEMICALS", filed on Feb. 17, 2011, the entire content of each being hereby incorporated by reference in its entirety. All publications, patents and mentioned herein are hereby incorporated by reference in their entirety as if each individual publication or patent was specifically and individually indicated to be incorporated by reference.

The invention claimed is:

1. A catalyst system having a meso and macro hierarchical pore structure comprising three-dimensional interconnecting pathways, the catalyst system comprising a non-zeolitic matrix and zeolite crystals wherein the zeolite crystals are homogeneously dispersed and suspended in the interconnecting pathways and further the pore size of the hierarchical pore structure ranges from about 300 to about $10^4$ Angstrom.

2. The catalyst system of claim 1, wherein the zeolite is selected from the group of ZSM-5, ZSM-33, ZSM-11 and combination thereof.

3. The catalyst system of claim 1 wherein the zeolite is beta zeolite, mordenite, a Faujasite-type zeolite or a IM-5 zeolite.

4. The catalyst system of claim 3, wherein the zeolite is beta zeolite.

5. The catalyst system of claim 3, wherein the zeolite is mordenite.

6. The catalyst system of claim 3, wherein the zeolite is a Faujasite-type zeolite or a IM-5 zeolite.

7. The catalyst system of claim 6 wherein the zeolite is selected from the group of Zeolite Y, USY zeolite, REUSY zeolite, DAY zeolite, dealuminated USY zeolite and combination thereof.

8. The catalyst system of claim 1, wherein the pore size of the hierarchical pore structure ranges from about 500 to about $5 \times 10^3$ Angstrom.

9. The catalyst system of claim 1 wherein the non-zeolitic matrix is a silica, an alumina, a combination of silica and alumina, a silica-alumina, a clay or combinations thereof.

10. The catalyst system of claim 9, wherein the non-zeolitic matrix comprises silica, alumina and clay.

11. The catalyst system of claim 9 wherein the non-zeolitic matrix is a dealuminated clay, a leached clay, a calcined clay or a combination thereof.

12. The catalyst system of claim 1 wherein the matrix comprises a clay, a modified clay, silica, alumina, silica-alumina, or combination thereof.

* * * * *